United States Patent

Gill et al.

[19]

[11] Patent Number: 5,887,897
[45] Date of Patent: Mar. 30, 1999

[54] APPARATUS FOR PRETENSIONING A VEHICULAR SEAT BELT

[75] Inventors: Harjeet Gill, Windsor, Canada; H. John Miller, III, Macomb Township, Mich.; Niels Dybro, West Utica, Mich.; Jason W. Raines, Harrison Township, Mich.

[73] Assignee: Breed Automoive Technology, Inc., Lakeland, Fla.

[21] Appl. No.: 795,112

[22] Filed: Feb. 6, 1997

[51] Int. Cl.$^6$ .................................................. B60R 22/46
[52] U.S. Cl. .............................. 280/806; 60/635; 60/632; 297/480
[58] Field of Search .................................. 280/806, 805; 60/635, 637, 638, 632; 297/479, 480; 242/374

[56] References Cited

U.S. PATENT DOCUMENTS

| 3,043,093 | 7/1962 | Scott | 280/806 |
| 4,237,690 | 12/1980 | Tsuge et al. | 280/806 |
| 5,207,618 | 5/1993 | Nishizawa | 280/806 |

FOREIGN PATENT DOCUMENTS

| 5-193446 | 8/1993 | Japan | 280/806 |

*Primary Examiner*—Peter C. English
*Attorney, Agent, or Firm*—Markell Seitzman

[57] ABSTRACT

A pretensioning apparatus for a vehicular safety restraint, which includes a housing; a tube extending from the housing and defining an inner surface; a piston disposed within the tube in close proximity to the inner surface of the tube; a linkage connected at a first end to the piston and having a second end which is adapted for connection to a safety restraint; and a lock member having at least a portion thereof disposed between the piston and the inner surface of the tube, the lock member being configured and dimensioned such that upon application of a force to the piston in a first direction, the lock member permits free movement of the piston in the first direction and upon application of a force to the piston in a second direction being reverse to the first direction, the lock member biases against the inner wall of the tube to prevent movement of the piston in the second direction.

16 Claims, 6 Drawing Sheets

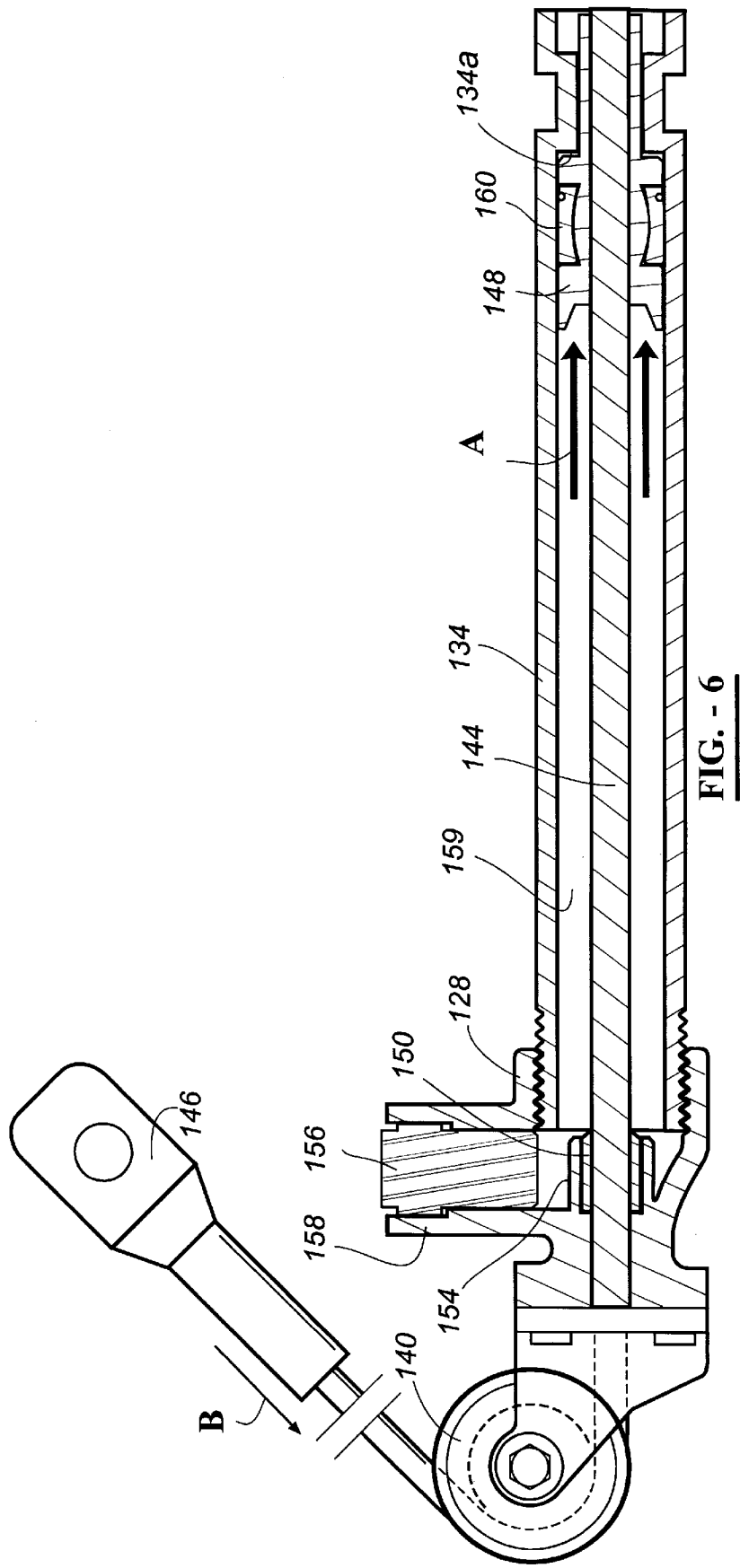

APPARATUS FOR PRETENSIONING A VEHICULAR SEAT BELT

BACKGROUND OF THE INVENTION

The present disclosure relates to vehicle restraint systems and more particularly to vehicle safety restraint pretensioning mechanisms which reduce slack in seat belts during impact.

With existing passenger vehicle restraint systems seat belts are provided with retractors which facilitate deployment and rewinding of the seat belt webbing in order to accommodate the individual using the system at any given time. Such retractors are also normally provided with locking features to lock the webbing based upon a predetermined operating parameter of either the seat belt webbing or the vehicle itself. For example, such systems will lock the webbing in the event of exceeding a predetermined acceleration of the belt or upon exceeding a predetermined rate of change in vehicle speed.

Another feature present in many vehicle restraint systems is a pretensioner mechanism. Such pretensioners commonly utilize a pyrotechnic device which detonates upon occurrence of predetermined parameters that define a triggering incident, e.g., impact of the vehicle with an object or another vehicle. Detonation of the pyrotechnic device initiates a rewinding of the seat belt webbing or a pull-down of the seat belt buckle a predetermined amount in the early stages of the triggering incident. This pretensioning of the seat belt webbing reduces the possible forward motion of an occupant during the triggering incident to reduce injury to the seat belt occupant which may otherwise result from impact with portions of the vehicle.

Upon detonation of the pyrotechnic device in such pretensioner mechanisms, extremely hot combustion gases are discharged to create the necessary pressure to drive a piston. A continuing need is always present for ways in which to reduce any undesirable side effects of these gases. For example, the scorching of any working parts which happen to be located in the flow path of the gases is such an undesirable side-effect.

In the past, seat belt pretensioning devices for buckles have been provided with wedges in attempts to maintain the pretension load. However, one disadvantage of such previous pretensioners is that they have been largely unsuccessful in maintaining a high percentage of the pretension load. These previous wedges were subject to unsatisfactory amounts of slippage in the strap system.

A need also exists for a pretensioning mechanism which effectively pretensions the seat belt webbing in the event of a triggering incident and which maintains a high percentage of the pretensioning load throughout the whole accident which triggered the pretensioner.

SUMMARY OF THE INVENTION

The present disclosure overcomes the above noted disadvantages of previous pretensioning devices by providing a pretensioning apparatus which keeps a high pretensioning load, lessens slippage of the safety belt strap and protects the operational components of the pretensioner from the extremely hot combustion gases of the pyrotechnic gas generator.

The present disclosure accomplishes these and other advantages by providing a pretensioning apparatus for a vehicular safety restraint, which includes a housing; a tube extending from the housing and defining an inner surface; a piston disposed within the tube in close proximity to the inner surface of the tube; a linkage connected at a first end to the piston and having a second end which is adapted for connection to a safety restraint; and a lock member having at least a portion thereof disposed between the piston and the inner surface of the tube, the lock member being configured and dimensioned such that upon application of a force to the piston in a first direction, the lock member permits free movement of the piston in the first direction and upon application of a force to the piston in a second direction being reverse to the first direction, the lock member biases against the inner wall of the tube to prevent movement of the piston in the second direction.

The lock member is preferably wedge-shaped and has a first region of thickness being greater than a second region of thickness, such that upon application of a force on the piston in the second direction, the first region of thickness slides relative to an outer surface of the piston to create friction between the piston and the inner wall of the tube sufficient to prevent movement of the piston in the second direction. The lock member may be formed of a plurality of wedges disposed circumferentially about the piston. In a further aspect of the present disclosure, the lock member is biased toward the outer surface of the piston by a retaining member.

In yet another aspect of the presently disclosed pretensioning apparatus, a portion of the outer surface of the piston may be convex and the retaining member positioned near one end of the locking member such that the other end of the locking member is biased against the inner wall of the tube. The retaining member is preferably an o-ring which compresses the locking member against the outer surface of the piston.

A fluid supply may also be provided in fluid communication with a fluid pathway formed in the tube on one side of the piston, the fluid supply being adapted to rapidly introduce pressurized fluid through the fluid pathway into the tube behind the piston to force the piston to travel along the length of the tube. In another aspect of the pretensioning apparatus, a shield is disposed in the fluid pathway between the fluid supply and the linkage such that upon introduction of a fluid from the fluid supply into the fluid pathway, the shield deflects the fluid away from the linkage. In this manner, the shield advantageously diverts the flow of fluid generated by the fluid supply thereby protecting the cable from damage.

The present disclosure further provides a pretensioning apparatus for a vehicular safety restraint, which includes a housing; a tube extending from the housing and defining an inner surface; a piston disposed within the tube in close proximity to the inner surface of the tube; a gas generator in fluid communication with the tube on one side of the piston such that a fluid pathway is formed from an outlet of the gas generator to the interior of the tube; a linkage connected at a first end to the piston and having a second end which is adapted for connection to a safety restraint; and a shield disposed in the fluid pathway between the outlet of the gas generator and the linkage, such that upon deployment of the gas generator the shield deflects the flow of gas away from at least a portion of the linkage.

The gas generator is preferably a pyrotechnical gas generator being adapted to rapidly introduce pressurized fluid through the fluid pathway into the tube behind the piston to force the piston to travel along the length of the tube in the first direction.

The present disclosure also provides a safety restraint system, which includes a belt adapted to restrain an occupant in a vehicular seat; a retractor operatively connected to the belt and adapted to protract and retract the belt under normal vehicle operating conditions; a pretensioner operatively connected to the belt and including: a housing; a tube extending from the housing and defining an inner surface; a piston disposed within the tube in close proximity to the inner surface of the tube; a linkage connected at a first end to the piston and having a second end which is adapted for connection to a safety restraint; and a lock member having at least a portion thereof disposed between the piston and the inner surface of the tube, the lock member being configured and dimensioned such that upon application of a force to the piston in a first direction, the lock member permits free movement of the piston in the first direction and upon application of a force to the piston in a second direction being reverse to the first direction, the lock member biases against the inner wall of the tube to prevent movement of the piston in the second direction.

Many other objects and purposes of the invention will be clear from the following detailed description of the drawings.

BRIEF DESCRIPTION OF THE DRAWINGS

Various embodiments are described herein with reference to the drawings, wherein:

FIG. 6 is a reduced view similar to that of FIG. 4, which shows the operation of the pretensioner;

DETAILED DESCRIPTION OF THE DRAWINGS

Figure 1:
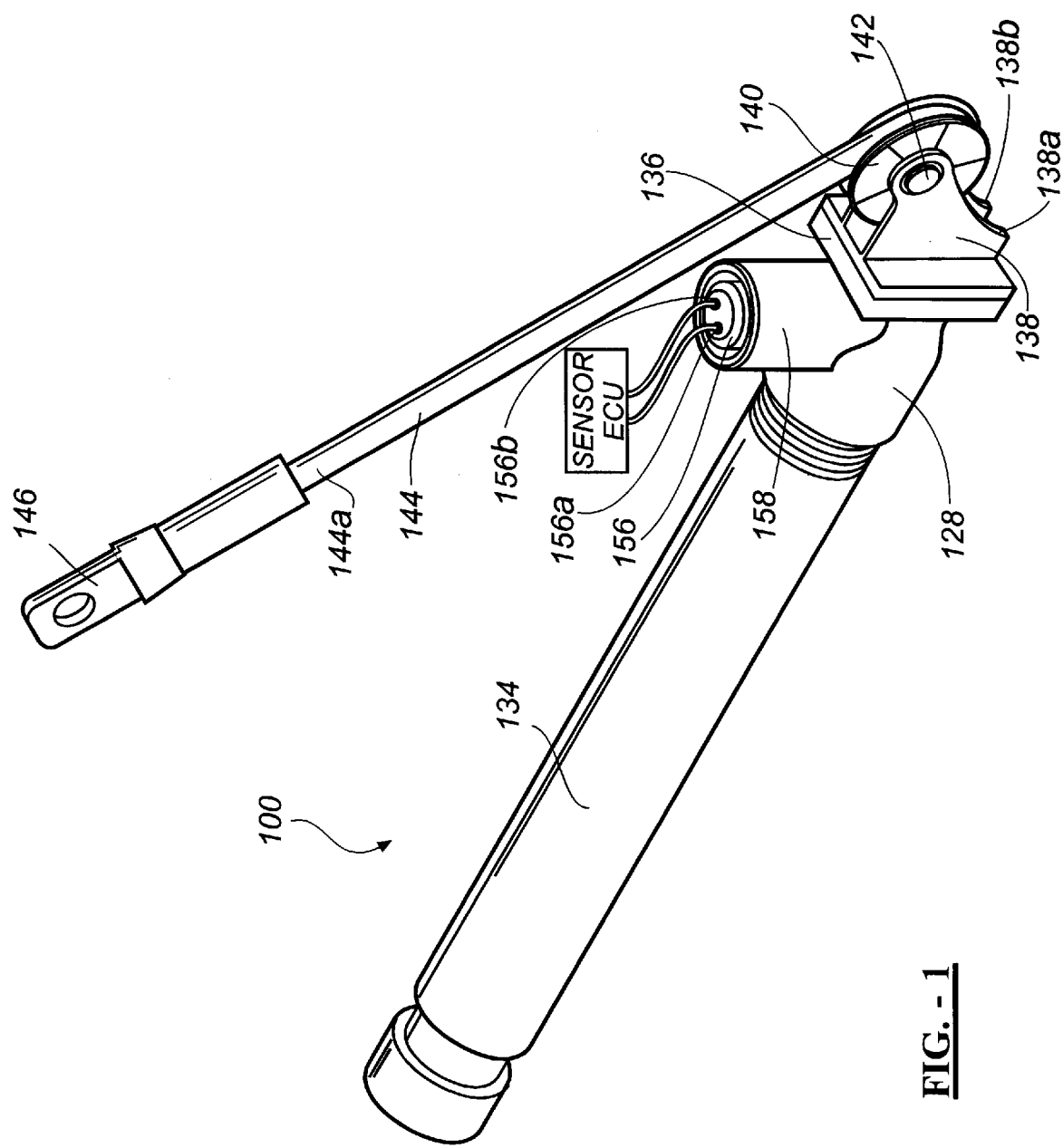
FIG. 1 is a perspective view of a safety restraint pretensioner constructed in accordance with the present disclosure.

Referring in specific detail to the drawings, in which like reference numerals identify similar or identical elements throughout the several views, and initially to FIG. 1, one embodiment of a safety restraint pretensioner constructed in accordance with the present disclosure is illustrated generally as pretensioner 100. Pretensioner 100 is preferably incorporated into a conventional three-point seat belt and airbag system, which, referring temporarily to FIG. 8, is generally illustrated as safety restraint system 110.

Briefly, system 110 includes a safety belt 112 which includes a shoulder belt portion 114 and a lap belt portion 116 which are protracted and retracted by a retractor mechanism 117. Such retractor mechanisms are generally known in the art, therefore, retractor 117 will not be discussed in greater detail herein. The shoulder belt portion 114 is supported by a webbing or belt support 118 which may consist of a D-ring mounted to the frame portion of the vehicle. Shoulder belt portion 114 and lap belt portion 116 are slidingly joined through a tongue 120 that is received within a buckle 122 located generally to one side of a seat 123. Buckle 122 is attached to pretensioner 100 to facilitate pretensioning of safety belt 112 during a triggering incident such as impact of the vehicle with another object or another vehicle. A steering wheel 124 has an airbag 126 positioned therein, (shown deployed in FIG. 8).

Referring again to FIG. 1 in conjunction with FIGS. 2–5, the structural components of pretensioner 100 will now be discussed in detail. Pretensioner 100 includes a housing 128 having a central, stepped bore formed therethrough which defines a narrow first portion 130 which opens to a first end of the housing 128 and a wider diameter second portion 132 which opens at the other end of housing 128. Wider second portion 132 defines a circular opening preferably provided with threading to threadably receive an elongated hollow tube 134. Narrow first portion 130 of housing 128 terminates in a flange 136 to which a bracket 138 is securely mounted, for example by bolting or other suitable fastening techniques. Bracket 138 is preferably in the form of a clevis having sides 138a and 138b (see FIG. 1). A pulley 140 is rotatably supported between clevis sides 138a and 138b by a pin or shaft 142. Additionally, a bushing (not shown) is preferably provided between shaft 142 and pulley 140.

Figure 5:
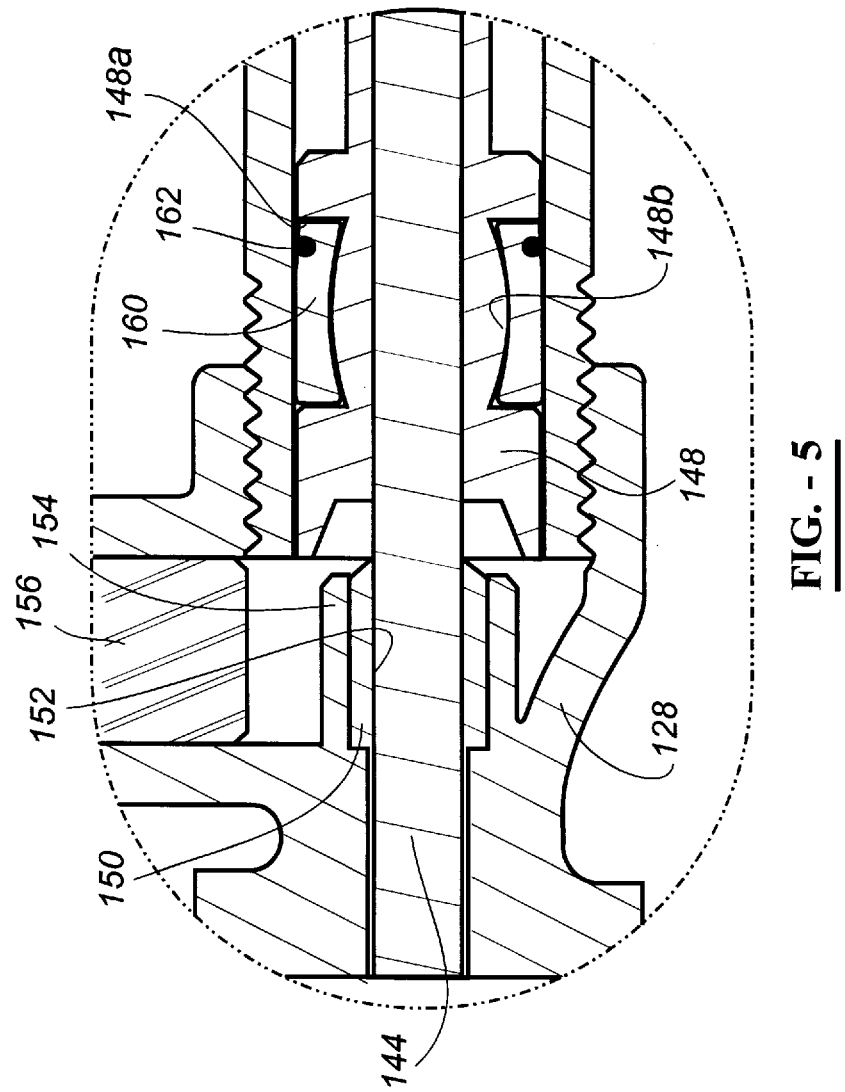
FIG. 5 is an enlarged view of the area of detail as indicated in FIG. 4.
Figure 8:
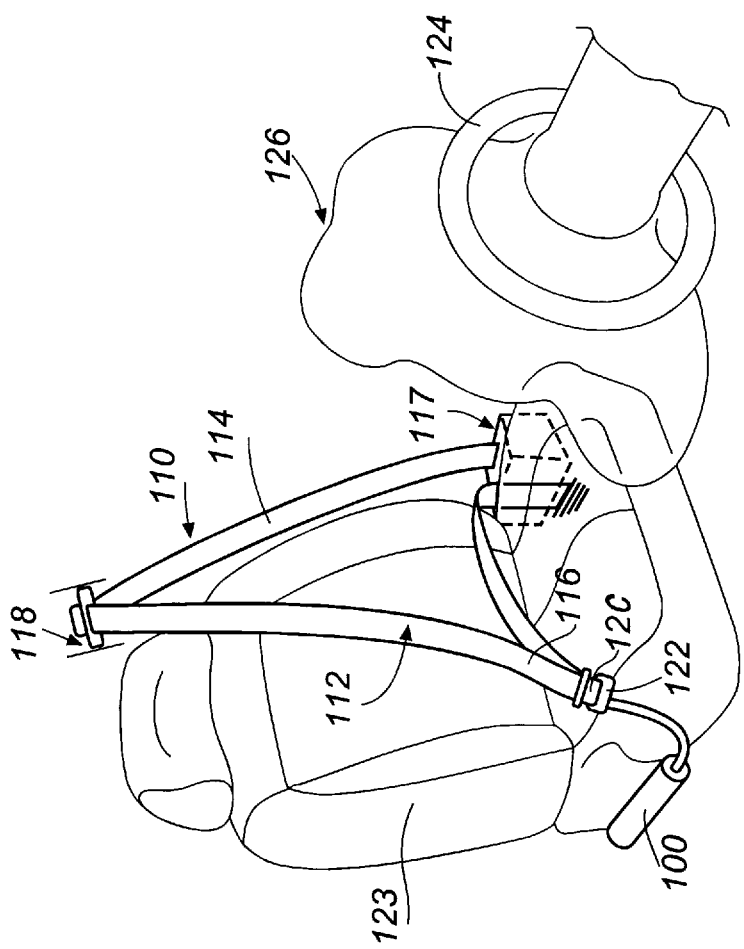
FIG. 8 is a perspective view of a safety restraint system which incorporates the pretensioner of the present disclosure.

A cable 144 is provided and is attached at one end 144a to the buckle of a seat belt such as buckle 122 (FIG. 8). Cable 144 may be securely fastened to buckle 122, for example, by end piece 146 being bolted to buckle 122. Cable 144 is wrapped around pulley 140 and extends into narrow first portion 130 of housing 128 and is attached at the other end to a piston 148, for example, by crimping or suitable attachment techniques. An annular seal member 150 is preferably disposed over end 144b prior to assembly of cable 144 and piston 148. Seal 150 is provided with a through bore 152, as shown in FIG. 5, the diameter of which is only slightly greater than the diameter of cable 144 so as to form a substantial fluid tight barrier preventing the escape of gases from the interior portion of housing 128 through narrow first end opening 130. Seal 150 additionally has an external circumference which preferably forms a slight interference fit with the internal diameter of extended shield 154 to securely maintain the positioning of the seal 150. Extended shield 154 is preferably molded as part of housing 128 and forms an annular protective barrier around cable 144 and seal 150.

Figure 4:
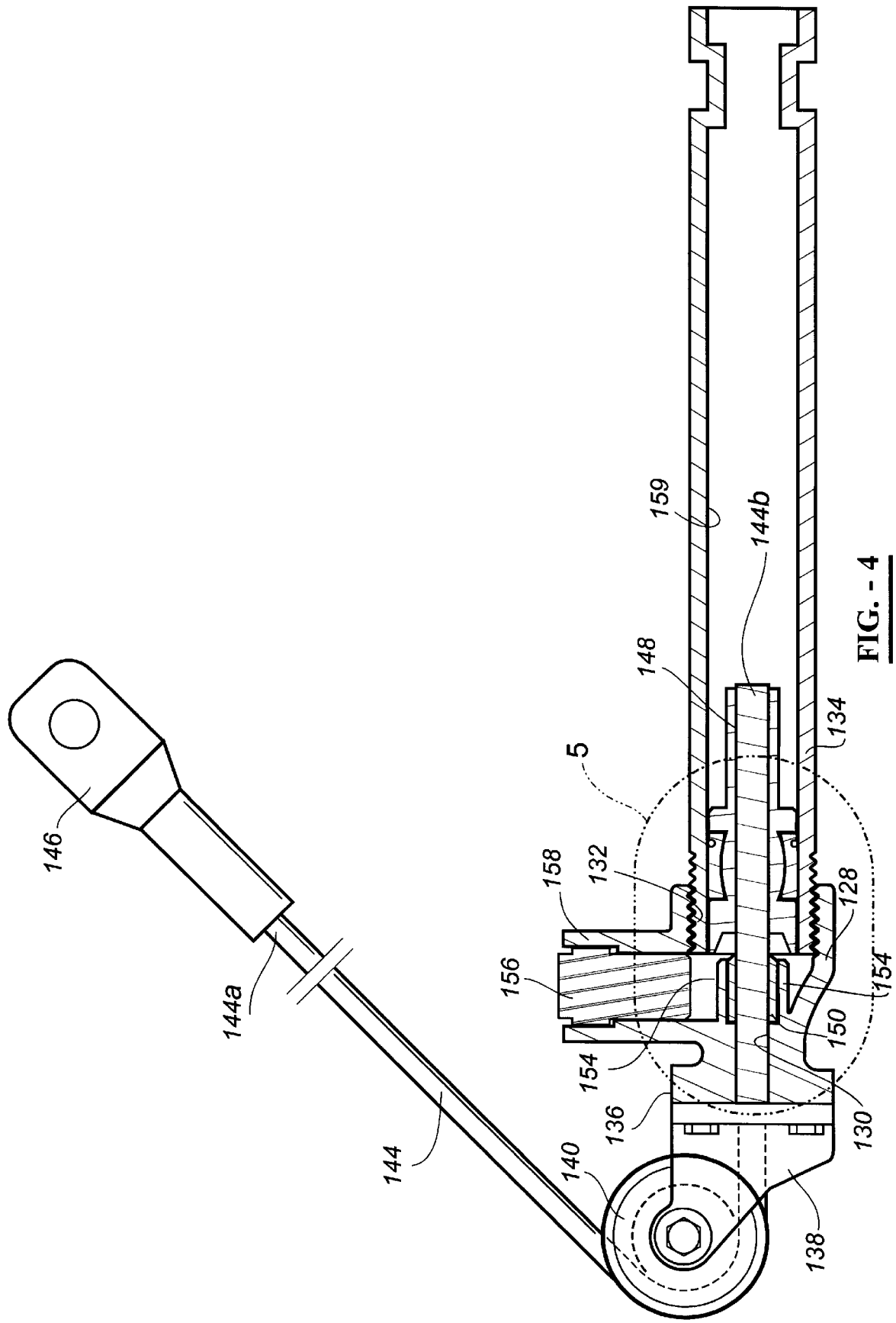
FIG. 4 is a partial cross-sectional view of the pretensioner of the present disclosure.

As shown in FIGS. 1, 4 and 5, housing 128 supports a gas generator generally shown as gas generator 156. Generator 156 is fitted in a socket 158 formed on the top of housing 128. Gas generator 156 is preferably a pyrotechnic element such as those known in the art and is responsive to an electrical signal generated by a sensor electronic control unit (SENSOR ECU) received at terminals 156a and/or 156b. Upon activation of the generator 156, combustion gases are generated which increase the pressure within the central bore 159 of tube 134. As the pressure inside tube 134 increases on one side of the piston 148, the piston moves to the right thereby pulling cable 144 along with it to the right as indicated by arrow "A" in FIG. 6. Upon continued movement of piston 148 and cable 144 to the right, cable end piece 146 is pulled downwardly in the direction indicated by arrow "B" in FIG. 6. This action lowers the height of the buckle relative to the vehicle seat or floor thereby achieving pretensioning of one or more of the lap belt 116 and the shoulder belt 114.

Figure 3:
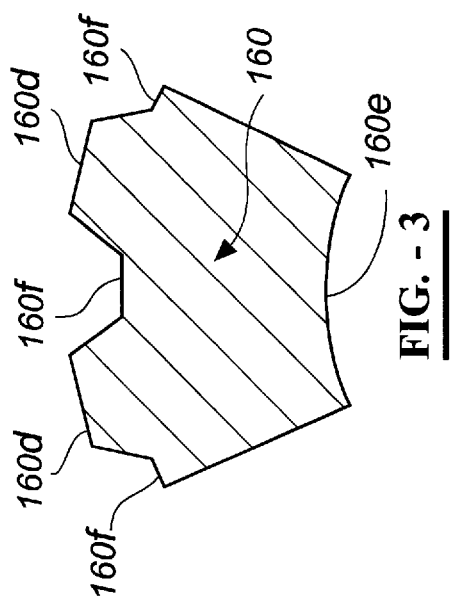
FIG. 3 is a cross-sectional view taken along section line 3—3 of FIG. 2.
Figure 2:
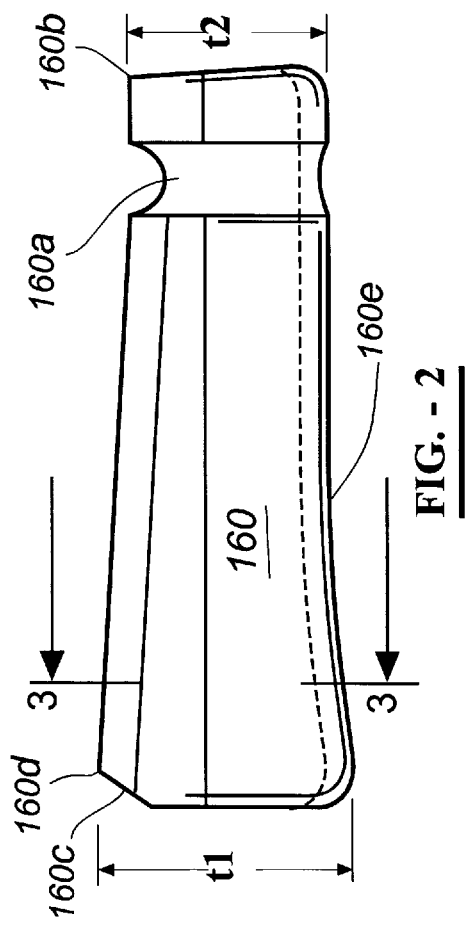
FIG. 2 is a side view of a locking wedge which forms part of the pretensioner of FIG. 1.

In order to maintain the pretensioning load on the seat belt created by the movement of cable 144, it is necessary to maintain piston 148 in its fully deployed position, i.e., at the end of the complete stroke. This lockout of piston 148 at the end of the stroke is achieved by providing the pretensioner 100 with lock members such as wedges 160. Referring to FIGS. 2 and 3, wedges 160 are preferably made of a metal which is at least of the same hardness as the inner surface of tube 134 and preferably has a hardness greater than the inner surface of tube 134. As illustrated in FIG. 2, each of the wedges 160 has a thickness which varies along the length of the wedge. The rear edge of wedge 160 having a thickness of "t1" and the leading edge of wedge 160 having a thickness of "t2". A rounded groove 160a is formed near leading edge 160b of the wedge and a chamfer 160c is provided at the upper rear corner of wedge 160 so as to provide a sharp corner edge 160d at the rear edge of the top surface of wedge 160. As shown in FIG. 3, each wedge 160 preferably has grooves 160f formed therein to reduce the contact surface area of the wedges with the inner wall of tube 134 thereby reducing the friction created when piston 148 moves along tube 134. Lower surface 160e of each wedge 160 is preferably longitudinally concave to facilitate the locking operation of the wedge, as will become evident from the description further herein. As shown in FIG. 5, wedges 160 are circumferentially disposed in a peripheral groove 148a formed around piston 148. Inner surface 148b of peripheral groove 148a is preferably formed to be convex to facilitate a rocking motion of wedges 160 upon application of a force pulling piston 148 to the left.

A retainer member such as elastomeric O-ring 162 is provided around wedges 160 and fitted in rounded groove segments 160a so as to maintain the forward end portions of wedges 160 biased toward inner surface 148b of groove 148 upon the piston. O-ring 162 additionally provides sealing to prevent the escape of combustion gases from the rear side of piston 148 to the forward side of piston 148. Prior to actuation of pretensioner 100, wedges 160 are maintained within the internal diameter of the inner surface of tube 134 so as to permit advancement of piston 148 down the length of tube 134 as shown in FIG. 4.

Figure 7:
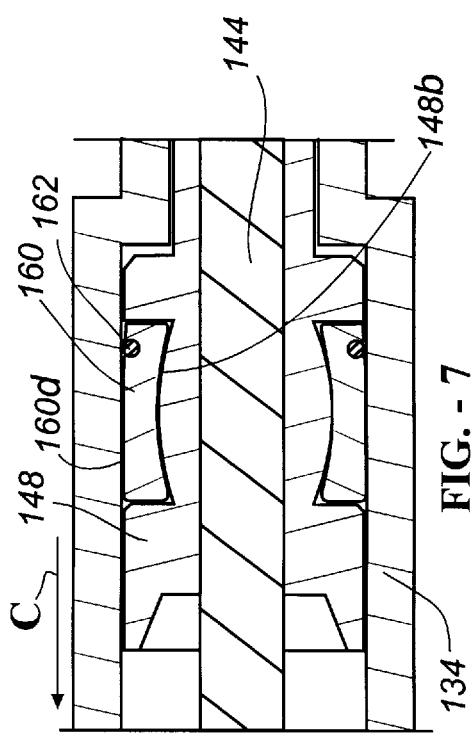
FIG. 7 is an enlarged partial cross-section view which shows the locking wedges in their locked position.

In operation, upon actuation of gas generator 156, pressure created by combustion gases drives piston 148 down the length of tube 134. The full stroke is completed when the piston runs into shoulder 134a formed near the end of tube 134 at a predetermined length to effect a predetermined pretensioning of the seat belt. As soon as the stroke is completed, any force in the reverse direction, e.g., by forward momentum of the occupant in the seat belt, will tend to pull cable 144 in the reverse direction thereby attempting to pull piston 148 in the reverse direction. If left unchecked, this loss of load on the seat belt would reduce the effectiveness of pretensioner 100. Accordingly, wedges 160 achieve instant locking in the opposite direction. As shown in FIG. 7, upon application of a force in the reverse direction as indicated by arrow "C", wedges 160 will slide along convex inner surface 148b of peripheral groove 148a. This rocking motion caused by the mating of convex surface 148b and concave surface 160e will urge sharp corners 160d of each of the wedges outwardly thereby drastically increasing the friction between wedges 160 and the inner surface of tube 134. Due to the drastically increased frictional contact and sharpness of corners 160d, piston 148 is instantly locked in the reverse direction to prevent loss of the pretensioning load achieved by the full stroke of piston 148 in tube 134.

It will be understood that various modifications can be made to the various embodiments of the presently disclosed pretensioner apparatus without departing from its spirit and scope. Therefore, the above description should not be construed as limiting the invention but merely as presenting preferred embodiments of the invention. Those skilled in the art will envision other modifications within the scope and spirit of the present invention.

We claim:

1. Apparatus for pretensioning a vehicular safety restraint, which comprises:

a housing;

a tube extending from the housing and defining an inner surface;

a piston disposed within the tube in close proximity to the inner surface of the tube, the piston including a first contact surface;

a linkage connected at a first end to the piston and having a second end which is adapted for connection to a safety restraint; and a lock member comprising at least one wedge having at least a first portion thereof disposed between the piston and the inner surface of the tube, a lower surface of the first portion defining a second contact surface in contact with the first contact surface of the piston, wherein one of the first and second contact surfaces is a radially outward extending convex surface and the other being a mating concave surface, the lock member being configured and dimensioned such that upon application of a force to the piston in a first direction, the lock member permits free movement of the piston in the first direction and upon application of a force to the piston in a second direction being reverse to the first direction, the lock member engages the inner surface of the tube to prevent movement of the piston in the second direction.

2. Apparatus for pretensioning a vehicular safety restraint according to claim 1, wherein the at least one wedge includes a first end region of thickness greater than the thickness of an opposing second end region, such that upon application of a force on the piston in the second direction, the wedge slides to additionally create an engagement with the piston sufficient to prevent movement of the piston in the second direction.

3. Apparatus for pretensioning a vehicular safety restraint according to claim 2, wherein the second end region of the at least one wedge is biased against the first contact surface of the piston by a first member which is positioned about the second end region of the wedge such that the first end region is biased toward the inner surface of the tube and wherein the first member further provides a seal against the inner surface of the tube.

4. Apparatus for pretensioning a vehicular safety restraint according to claim 3, wherein the first member is an o-ring which compresses the second end region of the at least one wedge against the first contact surface of the piston.

5. Apparatus for pretensioning a vehicular safety restraint according to claim 1, wherein the lock member is made up of a plurality of wedges disposed circumferentially about the piston.

6. Apparatus for pretensioning a vehicular safety restraint according to claim 1, which further comprises a fluid supply in fluid communication with a fluid pathway formed in the tube on one side of the piston, the fluid supply being adapted to rapidly introduce pressurized fluid through the fluid pathway into the tube behind the piston to force the piston to travel along the length of the tube.

7. Apparatus for pretensioning a vehicular safety restraint according to claim 6, which further comprises an annular shield radially disposed about a portion of the linkage and a fluid seal disposed between the linkage and the shield to prevent fluid from flowing along the linkage, the shield disposed in the fluid pathway between the fluid supply and the linkage such that upon introduction of a fluid from the fluid supply into the fluid pathway, the shield deflects the fluid away from the linkage and fluid seal.

8. Apparatus for pretensioning a vehicular safety restraint according to claim 1 wherein an outer surface of each wedge includes at least one groove to reduce sliding friction with the inner surface of the tube.

9. Apparatus for pretensioning a vehicular safety restraint, which comprises:

a housing;

a tube extending from the housing and defining an inner surface;

a piston disposed within the tube in close proximity to the inner surface of the tube;

a gas generator in fluid communication with the tube on one side of the piston such that a fluid pathway is formed from an outlet of the gas generator to the interior of the tube;

a linkage connected at a first end to the piston and having a second end which is adapted for connection to a safety restraint; and an annular shield radially disposed about a portion of the linkage and a fluid seal disposed between the linkage and the shield to prevent fluid from flowing along the linkage and out of the housing, the shield disposed in the fluid pathway between the outlet of the gas generator and the linkage, such that upon activation of the gas generator the shield deflects the flow of gas away from at least the portion of the linkage and the fluid seal; and which further comprises a lock member having at least a portion thereof disposed between the piston and the inner surface of the tube, wherein upon activation of the gas generator a force is applied on the piston in a first direction, the lock member is configured and dimensioned to permit free movement of the piston in the first direction and upon application of a force to the piston in a second direction being reverse to the first direction, the lock member biases against the inner surface of the tube to prevent movement of the piston in the second direction;

wherein the lock member is wedge-shaped having a first region of thickness being greater than a second region of thickness and a lower concave inward surface extending between the first region and the second region and wherein the piston includes a convex outward surface mating with the concave inward surface of the lock member, such that upon application of a force on the piston in the second direction, the lock member slides relative to the convex surface of the piston to create an interference between the piston and the inner surface of the tube sufficient to prevent movement of the piston in the second direction.

10. Apparatus for pretensioning a vehicular safety restraint according to claim 9, wherein the lock member is made up of a plurality of wedges disposed circumferentially about the piston.

11. Apparatus for pretensioning a vehicular safety restraint according to claim 9, wherein the lock member is biased toward the convex surface of the piston by a retaining member.

12. Apparatus for pretensioning a vehicular safety restraint according to claim 11, wherein the retaining member is an o-ring which compresses the lock member against the convex surface of the piston and further functions to provide a seal against the inner surface of the tube.

13. A safety restraint system, which comprises:

a belt adapted to restrain an occupant in a vehicular seat;

a retractor operatively connected to the belt and adapted to protract and retract the belt under normal vehicle operating conditions;

a pretensioner operatively connected to the belt and including:

a housing;

a tube extending from the housing and defining an inner surface;

a piston disposed within the tube in close proximity to the inner surface of the tube, the piston including a first contact surface;

a linkage connected at a first end to the piston and having a second end which is operatively connected to the belt; and a lock member comprising at least one wedge having at least a first portion thereof disposed between the piston and the inner surface of the tube, a lower surface of the first portion defining a second contact surface in contact with the first contact surface of the piston, wherein one of the first and second contact surfaces is a radially outward extending convex surface and the other being a mating concave surface, the lock member being configured and dimensioned such that upon application of a force to the piston in a first direction, the lock member permits free movement of the piston in the first direction and upon application of a force to the piston in a second direction being reverse to the first direction, the lock member engages the inner surface of the tube to prevent movement of the piston in the second direction.

14. A safety restraint system according to claim 13, wherein the at least one wedge includes a first end region of thickness greater than the thickness of an opposing second end region, such that upon application of a force on the piston in the second direction, the wedge slides to additionally create friction with the piston sufficient to prevent movement of the piston in the second direction.

15. A safety restraint system according to claim 13, which further comprises a gas generator in fluid communication with a fluid pathway formed in the tube on one side of the piston, the gas generator being adapted to rapidly introduce pressurized gas through the fluid pathway into the tube behind the piston to force the piston to travel along the length of the tube.

16. A safety restraint system according to claim 15, which further comprises an annular shield radially disposed about a portion of the linkage and a fluid seal disposed between the linkage and the shield to prevent fluid from flowing along the linkage and out of the housing, the shield disposed in the fluid pathway between the gas generator and the linkage such that upon introduction of gas from the gas generator into the fluid pathway, the shield deflects the gas away from the linkage and the fluid seal.

* * * * *